United States Patent [19]

Hakola

[11] Patent Number: 4,541,934
[45] Date of Patent: Sep. 17, 1985

[54] QUICK RELEASE CYCLONE APEX SYSTEM

[76] Inventor: Gordon R. Hakola, 6851 N. Deone La., Tucson, Ariz. 85704

[21] Appl. No.: 515,282

[22] Filed: Jul. 19, 1983

[51] Int. Cl.$^4$ .............................................. B01D 45/12
[52] U.S. Cl. ..................................... 210/787; 210/238; 210/512.1; 209/139 A; 209/144; 209/211
[58] Field of Search ............... 210/787, 788, 789, 232, 210/237, 238, 304, 512.1, 512.2, 512.3; 209/139 R, 139 A, 144, 199, 211; 55/435, 459 R; 406/173; 162/272

[56] References Cited

U.S. PATENT DOCUMENTS

| | | | |
|---|---|---|---|
| 3,370,408 | 2/1968 | Lehrer et al. | 210/512.1 |
| 3,724,674 | 4/1973 | Loison | 210/512.1 |
| 3,902,601 | 9/1975 | Townley | 209/144 |
| 3,947,364 | 3/1976 | Laval, Jr. | 210/788 |
| 4,163,726 | 8/1979 | Wilson et al. | 210/512.1 |
| 4,308,134 | 12/1981 | Lilleker et al. | 210/512.1 |
| 4,400,267 | 8/1983 | Brose | 209/211 |

*Primary Examiner*—Richard V. Fisher
*Assistant Examiner*—Wanda L. Millard
*Attorney, Agent, or Firm*—Cahill, Sutton & Thomas

[57] ABSTRACT

A quick release apex apparatus for a cyclone includes a semirigid cast urethane, neoprene or rubber apex with an integral splash skirt and an upper annular flange for clamping the apex to the bottom flange of a cone of the cyclone. A quick release split ring clamp has a first section bolted to the flange of the cone and a second section pivotally connected to the first section. A single worker can change a worn apex of even a large cyclone by using one hand to hold the apex in its position and the other hand to release the second section of the quick release clamp and swing it away from the apex flange. The worker then removes the worn apex, sets it aside, lifts a replacement unit into alignment with the cone, swings the second section of the quick release clamp closed and locks it. An outer portion of the apex assembly is ribbed. An adjustable clamp band is disposed about the ribs, allowing gradual tightening of the apex to compensate for orifice wear. A blow-through hole extending part way into the wall of the apex allows a small amount of leakage when the apex needs replacement. In one embodiment of the invention, a replacement apex has opposed straight support flanges that are inserted into a pair of opposed receiving tracks attached to the lower flange of the cone to allow lateral removal and replacement of an apex while the cyclone is operating.

15 Claims, 17 Drawing Figures

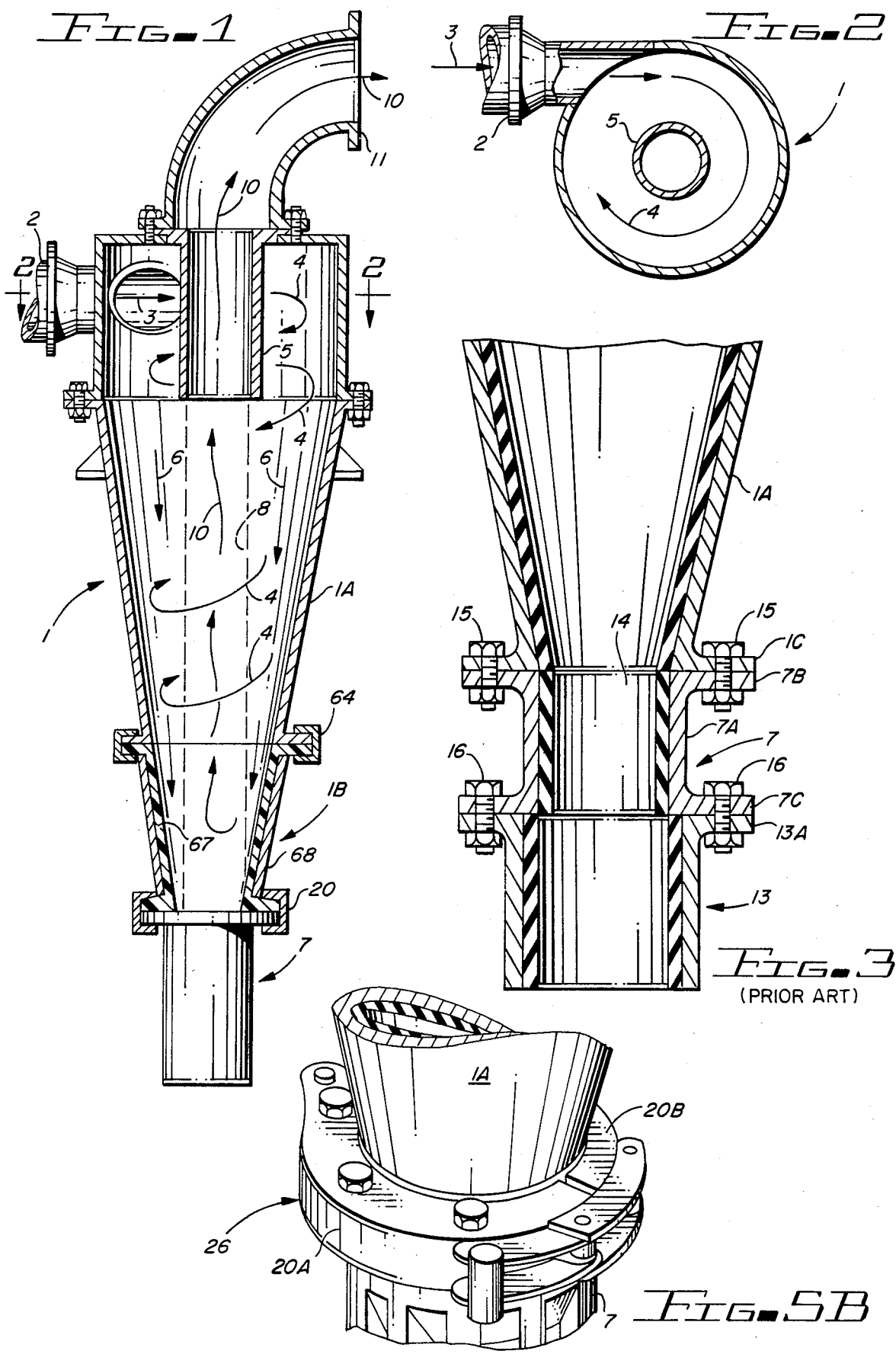

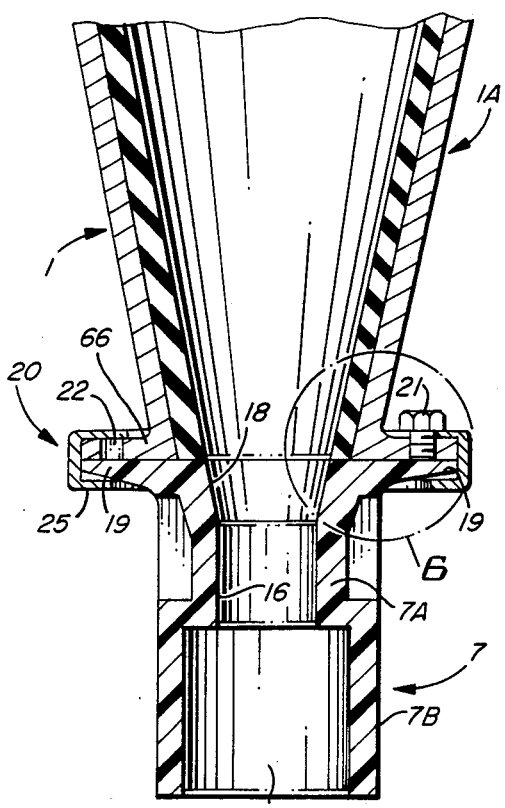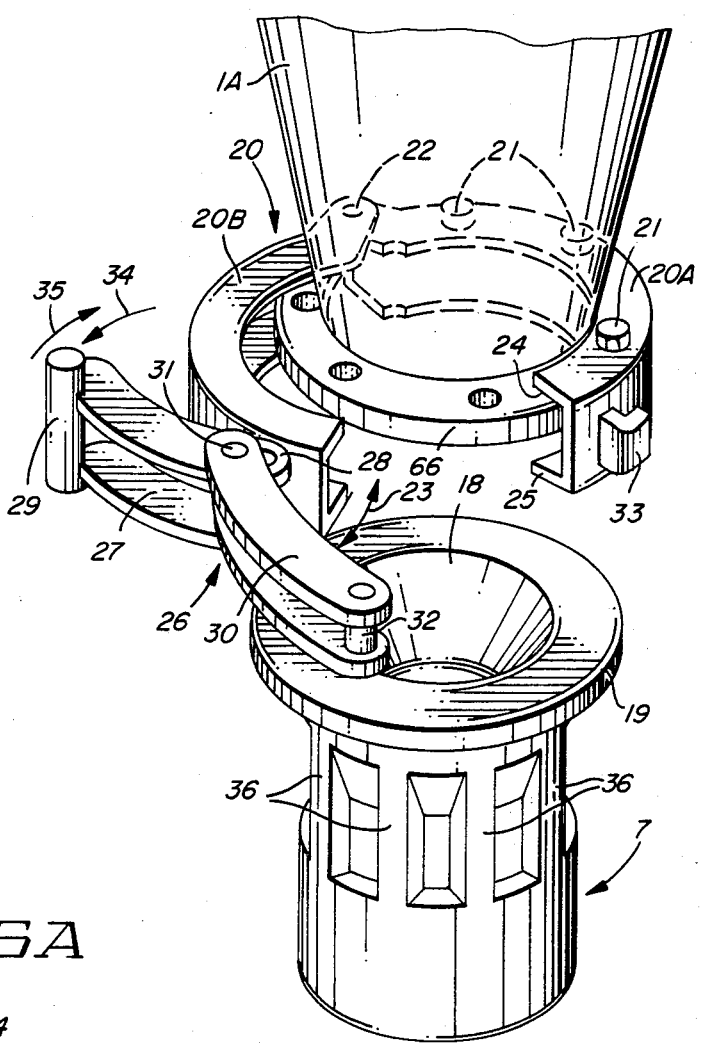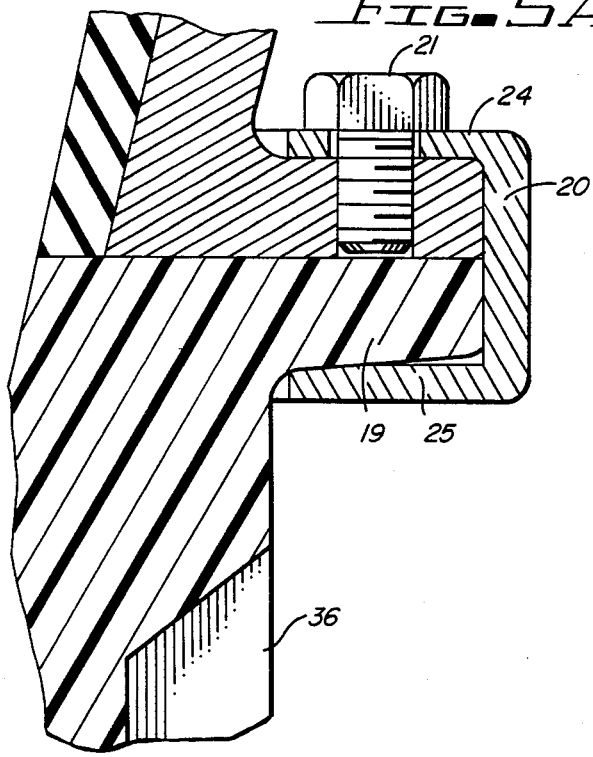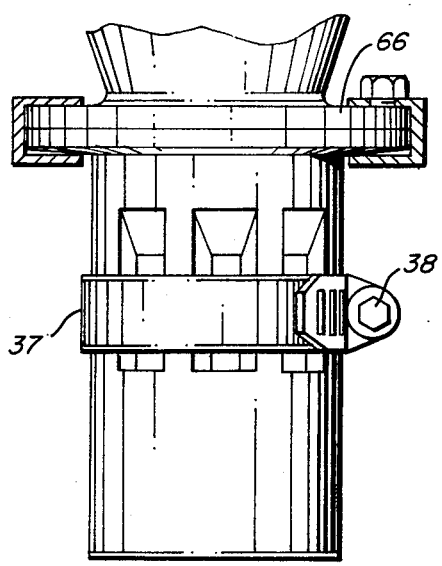

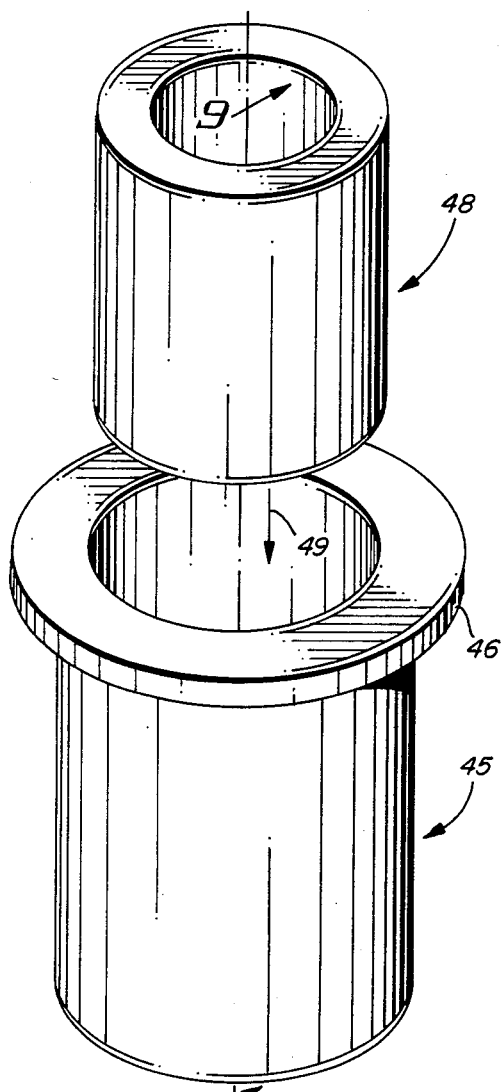
Fig. 8
Fig. 9
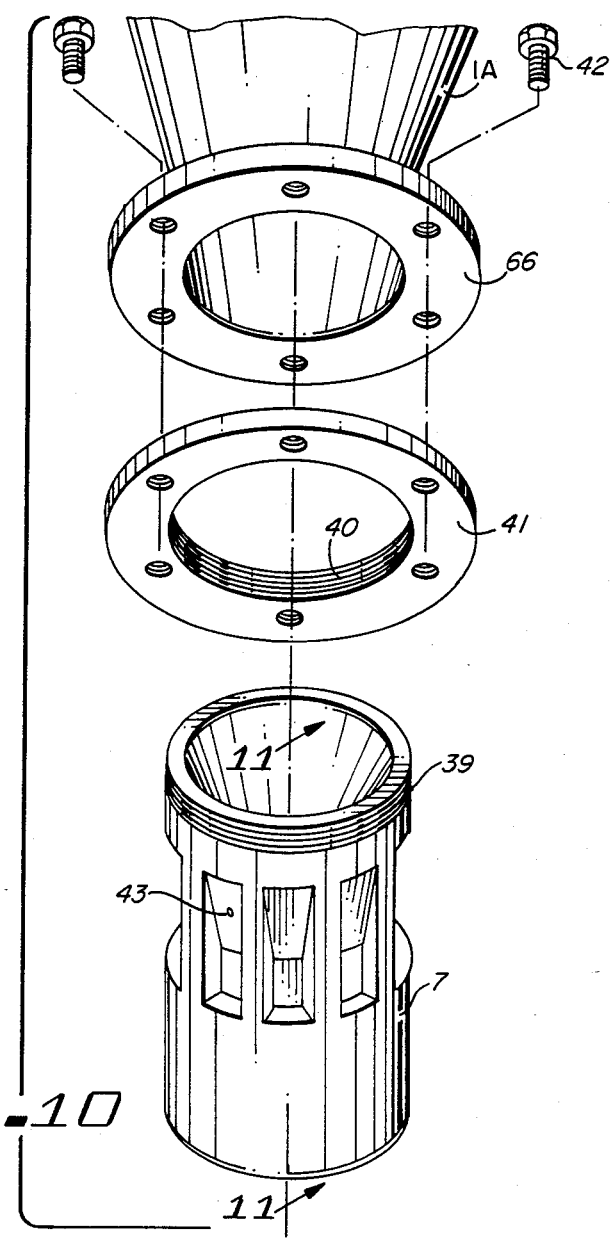
Fig. 10
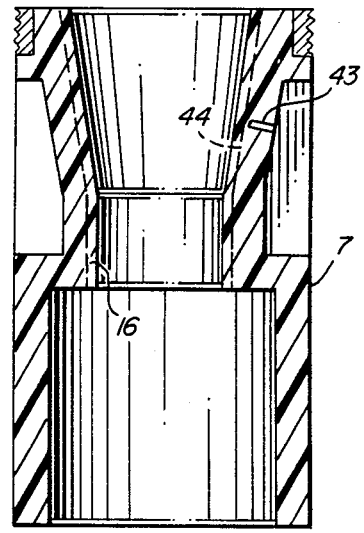
Fig. 11

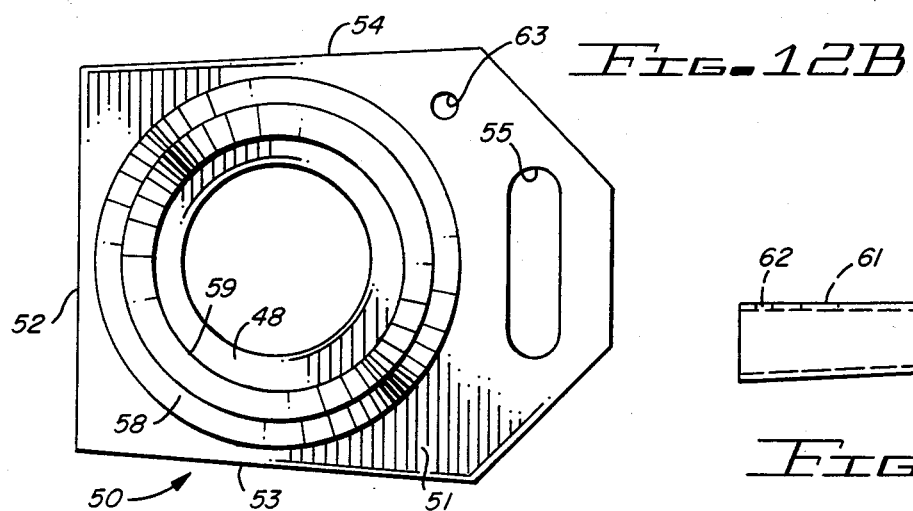
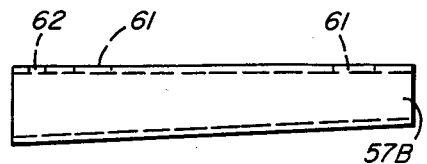
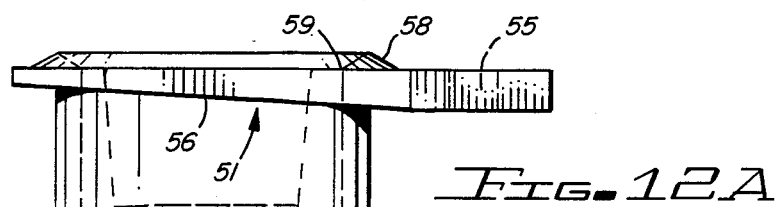
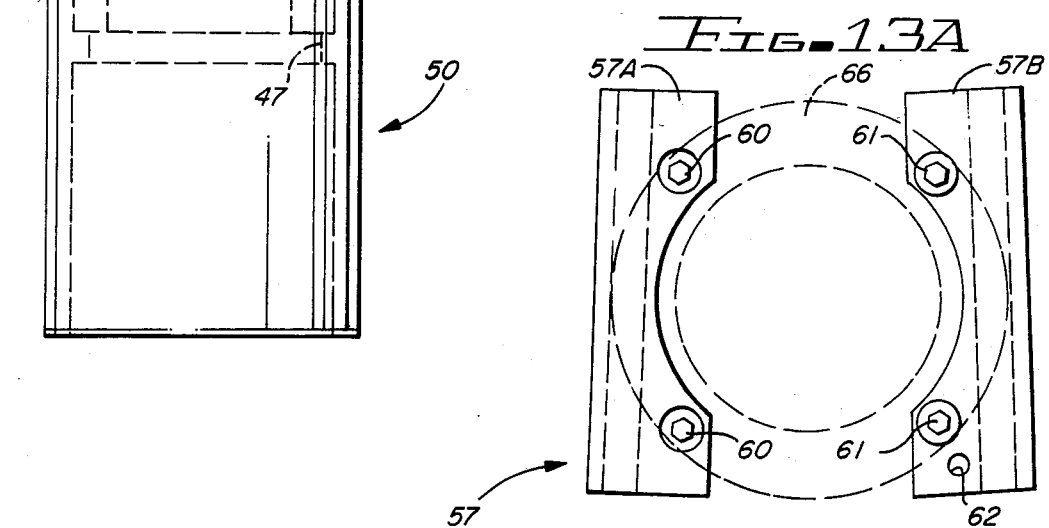
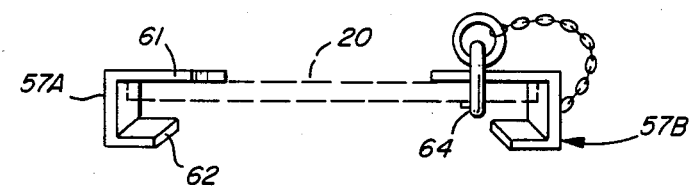

QUICK RELEASE CYCLONE APEX SYSTEM

BACKGROUND OF THE INVENTION

The invention relates to cyclones and, more particularly, to throw-away apexes and quick release means for exchanging worn apexes for new ones.

Cyclones and hydrocyclones are devices which are used in various industries to separate different size particles that are fed as a mixture into a cyclone inlet. In ore processing industries, cyclones are in circuit with grinding mills and are usually assembled in a circular "cluster" over a circular "tub" into which the coarser particles passing through the cyclone are discharged and fed back into the grinding mill. The outlet or overflow of the cyclone is where the fine particles that are internally separated pass out of the cyclone. As those skilled in the art know, cyclones include as their primary components an inlet, a cone section which tapers down from a large diameter to a small diameter, an internal vortex finder, and an outlet through which fine particles and liquid carrying them are discharged. As the coarse particles rotate and fall toward the apex, the density thereof increases and abrasion caused thereby increases. Since the primary function of the apex orifice of a cyclone is to discharge the coarse material at the highest possible density, and since the amount of water leaving the cyclone with the coarse material is critical, the proper apex diameter for a particular cyclone and set of operating conditions also is critical. If the apex orifice is too small, the cyclone will plug, and the entire cyclone feed, including the coarse particles, will pass out of the cyclone overflow outlet. On the other hand, if the apex orifice is too large, excessive amounts of water pass out of the lower end or underflow of the cyclone. Such excessive amounts of water passing through the cyclone underflow outlet pull excessive amounts of the fine particles that should otherwise "separate" into the vortex section and be discharged as overflow. The fine particles then unnecessarily pass back through the grinding mill, resulting in an inefficient milling operation. Other factors than apex diameter also strongly effect the performance of the cyclone, including the inlet feed density, the solids and the specific gravities of the solid material and the liquid material being fed to the inlet, the viscosity of the slurry material, and the pressure drop across the cyclone. Nevertheless, a high maintenance item of any cyclone is usually the apex. Typical prior art cyclone apexes include a cylindrical and/or conical body section with a liner which can be composed of loose ceramic, neoprene, urethane, or rubber, depending upon the abrasion and corrosion resistant properties needed for the material passing through the apex. The primary function of the apex is to discharge the coarse material at as high a density as possible without plugging the apex. Since the apex passes the coarser, sharp particles of the cyclone feed material, constant wear and high maintenance of the apex is a problem that has persisted historically. In most instances, the lower cone section, apexes, and anti-splash skirt extensions are all assemblies with "bolt on" flange connections. Due to the high liquid environment (usually water), rusting of the bolts interconnecting the flanges of the different removable sections typically occurs. Usually, removal of an apex is a two man operation, one worker using wrenches to remove the bolts, the other worker holding the apex and/or skirt in place. If excessive rusting has occurred, it may be necessary to call a welder, who cuts or "burns" the bolts off. For a large state-of-the-art cyclone which may have a diameter as large as two feet or more, the services of two workers are required for approximately fifteen minutes to one half hour to change one worn out apex. Typically, the apex of a cyclone may need to be changed as often as every two or three months, depending on the operation and ore characteristics. Occasionally, steel grinding balls and oversize ore are circulated through pumps and into the cyclones, usually the result of damaged screens, and can cause plugging of the cyclone and/or damage to rigid, ceramic type apexes and lower cyclone liners.

Typically, the splash skirt portion, if required, is attached to the lower flange of an apex and wears at a different rate than other parts of the cyclone. Ordinarily then, in order to replace the skirt section, it must be unbolted from the bottom flange of the apex. Furthermore, even though the lower portion of the cone does not wear as fast as the apex and skirt, it still wears considerably more rapidly than the upper portions of the cone. As a result, the lower cone sections also must be periodically replaced. The total amount of work and man-hours that are required for changing the lower cone sections, apex sections and skirt sections of conventional cyclones is high, increasing the cost of cyclone operations. It would be very desirable to allow cyclone apexes to be quickly replaced and in certain instances without turning off a particular cyclone. The state of the art is indicated in U.S. Pat. Nos. 3,902,601; 4,233,160; 3,984,308; 3,724,674; 2,897,972; 2,816,658; and 2,665,809. U.S. Pat. No. 3,902,601 discloses an apex insert which is seated in the lower portion of the cone. The cone is composed of urethane. The upper portion of it rests in and is surrounded by a steel upper cone sleeve and is a bolted connection. The apex insert may be replaced while the cyclone is in operation by removing a detachable ring attached to the bottom of the cone. The need for the replaceable cones and especially for easily replaceable apexes is recognized in U.S. Pat. No. 3,902,601, but the arrangement shown does not avoid the severe corrosion of bolts that must be loosened, nor does it avoid as much labor and inconvenience as is desirable. Although various ways of attaching apexes and lower cone sections and skirt sections to cyclones have been used in the prior art, the high amount of labor that is required for replacement of these portions of a cyclone has not been solved.

Accordingly, it is the primary object of the invention to provide an apparatus and method for achieving a quick release connection of an apex to a cone of a cyclone to allow rapid replacement or unplugging of the apex by a single worker.

It is another object of the invention to provide a low cost apex which can be discarded after use.

It is another object of the invention to eliminate metal housings and reduce the total number of components of a cyclone.

It is another object of the invention to provide a means for effectively replacing an apex of a cyclone without stopping the entire cyclone operation and without requiring the efforts of more than a single worker in the replacement operation.

It is another object of the invention to provide means for enabling an operator or worker to quickly and easily recognize when the apex of a cyclone needs to be replaced.

It is another object of the invention to provide a low cost apex assembly which both overcomes the difficulties associated with replacement of prior apex apparatus and also allows periodic adjustment of the diameter of the apex to compensate for ongoing abrasion thereof.

It is another object of the invention to quickly change the apex diameter for sudden changes in ore and grinding characteristics to effect better control of the entire grinding/classification circuits.

SUMMARY OF THE INVENTION

Briefly described, and in a accordance with one embodiment thereof, the invention provides a quick release apparatus for effectuating rapid replacement of the apex of a cyclone. In one described embodiment of the invention, a cast neoprene, urethane or rubber apex has an integral splash skirt attached to the lower section. An annular flange is attached to the top of the apex and is integral therewith for attachment in fixed relation to the lower flange of the cone section of the cyclone. The quick release device includes a split ring clamp with a first half ring section having an upper flange or lip, the midportion of which is tightly bolted to the top surface of the flange at the bottom of the cone. A second half ring section of the clamp ring is pivotally connected to the first section of the clamp ring. Both sections of the quick release ring have corresponding upper and lower lips or flanges that engage the cone flange and the apex flange, respectively. The lower surface of the flange of the apex is sloped to cause tightening of the upper surface of the flange of the apex against the lower surface of the flange of the cone as the quick release split clamp ring is tightened. Even for a large cyclone, a single worker can easily and quickly replace a worn apex in a few minutes, without the need for removing and replacing corroded bolts and simultaneously holding the apex in alignment with the lower flange of the cone. In one described embodiment of the invention, a neoprene, urethane, or rubber housing is provided with an integral lower splash skirt and an upper annular flange for engagement by the quick release clamp. An inner annular ledge is disposed on the inner surface of the housing to function as a seat for the lower edge of a "slip-in" ceramic type "apex liner". In this device, long apex wear is achieved with the advantage of quick release removal and reinstallation of the housing with a new apex liner.

In another embodiment of the invention, the outer surface of the walls of the apex are ribbed. A clamp is disposed around the ribbed portion of the apex to allow occasional tightening of the clamp to slightly reduce the inner diameter of the apex in order to compensate for orifice enlargement due to abrasion. A "blow-through" hole extending partially from the outer surface of the apex into the wall thereof causes a minute amount of leakage that provides an indication to a worker when the apex is so worn that replacement is desirable.

In another embodiment of the invention, a cast urethane, neoprene, rubber or other suitable material apex with integral skirt includes an upper support flange that slides laterally into a track supported in fixed relation to the lower flange of the cone, allowing a worker to grasp a handle attached to the side of the apex and simply slide it into a seating position while the cyclone is operating.

BRIEF DESCRIPTION OF THE DRAWINGS

FIG. 1 is a partial section view of a cyclone.

FIG. 2 is a partial section view useful in explaining the operation of the cyclone of FIG. 1.

FIG. 3 is a section view useful in illustrating prior art apex and splash skirt configurations with bolt-on attachment flanges.

FIG. 4 is a section view illustrating the quick release clamp mechanism of the present invention.

FIG. 5A is a partial perspective view useful in illustrating the quick release apex clamp assembly of the present invention.

FIG. 5B is another partial perspective view illustrating the quick release clamp and apex assembly of FIG. 5A in its locked configuration.

FIG. 6 is a partial section view which is an enlarged view of detail 6 in FIG. 4.

FIG. 7 is a partial elevation view illustrating a clamp band which can be utilized to adjust the inside diameter of the apex of the present invention.

FIG. 8 is a perspective view illustrating an apex with a cast urethane, neoprene, or rubber housing and a slip-in ceramic apex liner.

FIG. 9 is a section view taken along section line 9—9 of FIG. 8.

FIG. 10 is a partial exploded perspective view of a plastic apex with a threaded connection to the cone of a cyclone.

FIG. 11 is a section view taken along section line 11—11 of FIG. 10.

FIG. 12A is a section view of another apex of the present invention.

FIG. 12B is a top view of the apex shown in FIG. 12A.

FIG. 13A is a top view illustrating the track in which the apex of FIGS. 12A and 12B laterally slides to a position beneath the cone of a cyclone.

FIG. 13B is a front view of the track shown in FIG. 13A.

FIG. 13C is a side view of the track shown in FIG. 13A.

DESCRIPTION OF THE INVENTION

Referring now to FIGS. 1 and 2, the basic features of a cyclone will be described. Reference numeral 1 designates the entire cyclone. Briefly, the input to cylone 1 is in the form of a slurry containing, for example, a range of different sized ore particles received or pumped from a grinding mill. (Cyclones are also used to separate other kinds of particles of different sizes, for example, in making pulp for paper manufacturing operations). This slurry of inlet ore particles is fed into inlet 2 of cyclone 1, as indicated in FIG. 2 by arrow 3. The slurry pumped through the inlet passes into the portion of cyclone 1 surrounding a vertical cylindrical vortex finder 5 and circulates around it in the direction indicated by arrow 4. Due to the weight of the incoming slurry, peripheral portions of it, and especially the larger particles therein, tend to fall downward as it circulates (see arrows 4) into the lower cone section 1A, as indicated by arrows 6. Some larger cyclones have a removable "lower cone" section, which is designated by reference numeral 1B in FIG. 1. An apex 7 is removably attached to the bottom of the lower cone section 4B. Dotted line 8 in FIG. 1 represents a vortex which consists of an upwardly moving quantity of the finer particles contained in the inlet slurry 3 moving in the direction of arrows 10 to the outlet 11 of cyclone 1. The heavier particles and water carrying them are discharged through the orifice of apex 7.

At this point, understanding of the problems of the prior art apexes will be best understood by reference to FIG. 3, wherein reference numeral 7 designates an apex. Reference numeral 13 in FIG. 3 generally designates an anti-splash skirt. Apex 7 has an outer jacket or "spool" designated by reference numeral 7 having an upper flange 7B and a lower flange 7C. The jacket or spool 7A may be cast iron or other metals. Internally, apex 7A is lined with a suitable abrasion resistant neoprene, urethane, rubber or ceramic liner 14 which is much more resistant than the iron to abrasion of the coarser particles being forced at high density and high velocity through the orifice of apex 7. Especially pertinent to the present invention is the fact that the upper flange 7B of apex 7 is circumferentially bolted by means of bolts 15 to the lower flange 1C of cone section 1A. As previously mentioned, these bolts must be loosened and removed, if possible, by means of a wrench, in order to replace apex 7 in FIG. 3 when it becomes worn. Often, a torch is required to cut the bolts 15 loose because they are so badly corroded, even after a few months of cyclone operation. Similarly, splash skirt 13 is peripherally bolted by means of bolts 16 which draw the lower flange 7C of apex 7 against the flange 13A of skirt 13. Often, both sets of bolts 15 and 16 must be removed in order to replace a worn out apex 7, if skirt 13 is not also worn out. Note that skirt 13 may be lined with the same abrasion resistant material as apex 7, but has a larger inside diameter.

Referring now to FIG. 4, an important feature of the present invention will be explained. As in FIG. 1, reference numeral 7 designates the apex attached to the bottom flange 66 of cone 1A. Apex 7 in FIG. 4 includes an orifice 16, the correct diameter of which is critical to efficieint operation of cyclone 1. An enlarged skirt orifice is designated by reference numeral 17. Both the apex portion 7A and the skirt portion 7B are cast out of neoprene, urethane, or rubber having a durometer number selected to provide optimum resistance to abrasion and/or corrosion by the particular kind of slurry being fed through cyclone 1. The upper portion of orifice 16 is designated by reference numeral 18 and is flared outward to match the inside surface of the lower portion of frusto-conical cone section 1A. An annular circumferential flange 19 is integrally casted with the rest of apex-/skirt unit 7, and has a slightly sloped lower surface, the purpose of which is subsequently explained.

Referring now to FIG. 5A, as well as to FIG. 4, a quick release split clamp ring 20 is used to securely attach apex/skirt unit 7 to the bottom flange 66 of cone 1A. Clamp 20 is a split ring clamp having a first portion 20A which is peripherally bolted by means of bolts 21 to the upper surface of cone flange 66. The freely swinging section 20B of quick release clamp 20 is pivotally connected by pin 22 to the stationary section 20A and can be swung inward and outward in the directions of arrow 23 as shown in FIG. 5A. Each of the two sections 20A and 20B of quick release clamp 20 has an upper lip or flange 24 which engages the upper surface of cone flange 66 and a lower lip or flange 25 which engages the lower, sloped face of flange 19 of apex/skirt unit 7, as seen in FIG. 4 and FIG. 6.

A locking and latching mechanism generally designated by reference numeral 26 in FIG. 5A is attached to the free end of clamp ring member 20B. Latch mechanism 26 includes a first lever 27 having an inner end pivotably connected by a pin 28 to the outer surface of the free end of clamp member 20B. A handle 29 which can be easily gripped by one hand of a worker is attached to the outer end of lever 27. Locking assembly 26 includes a latch arm 30, one end of which is connected pivotablly by a pin 31 that is spaced from pin 28 on lever 27. At the outer free end of arm 30 is a catch bar 32 that engages a hook 33 which is rigidly connected to the front end of clamp member 20A. Catch bar 32 can engage hook 33 when lever 29 is swung outward from clamp member 20A in the direction of arrow 34. Then, when lever 27 is forced in the direction of arrow 35, arm 30 and bar 32 draw pivotally connected clamp member 20B tightly against the flange 66 of cone 1A and flange 19 of apex 7, so that the upper and lower flanges or lips of each clamp member attach apex 7 tightly to flange 66 of cone 1A. As seen in FIG. 4, the lower face of apex flange 19 is sloped so that as latching mechanism 26 is tightened, an upward force is exerted thereon by lips 24 as clamp 20 is tightened, perfecting the seal between flange 19 and cone flange 66.

The configuration of quick release lock mechanism 26 in its closed position is shown in FIG. 5B.

In accordance with another aspect of the present invention, a plurality of spaced ribs 36 are formed about the outer periphery of apex 7. The elimination of the material between ribs 36 reduces the amount of neoprene, urethane or rubber material needed for the smaller diameter apex orifice portion of apex 7, and also reduces the thickness but adds to the rigidity of the structure enough that an adjustable metal band 37 (shown in FIG. 7) can be installed around the ribbed portion of apex 7. Tightening clamp band 37 by rotating the screw gear 38 causes the wall of the ribbed portion of apex 7 to be drawn inwardly. This can be done periodically to reduce the diameter of orifice 16 (FIG. 4) to compensate for wear due to abrasion that occurs during operation of cyclone 1.

In accordance with another aspect of the present invention, the apex 7 shown in FIG. 10 is provided with a threaded upper end portion 39. The threaded portion 39 fits into mating threads 40 in an adaptor flange 41. Adaptor flange 41 has holes which are aligned with holes in cone flange 66 of cone 1A and is permanently bolted thereto by means of bolts 42. Then apex 7 is installed on and removed from cone 1A by simply threading it into or out of adaptor 41. In accordance with another aspect of the present invention, a "blow-through" hole 43 is provided adjacent to the apex orifice portion of apex 7, and extends part way through the wall thereof, as best seen in the section view of FIG. 11. Then, when abrasion has worn the wall thickness adjacent to apex orifice 16 to the point indicated by dotted lines 44 in FIG. 11, a small amount of the water or other liquid in the slurry will slowly leak out (through) blow hole 43, thereby alerting a roving operator that it is time to discard apex 7 and replace it with a new one.

Referring now to another embodiment of the invention shown in FIGS. 8 and 9, apex "housing" 45 has an upper flange 46 which can be engaged by the lower lips of quick release clamp 20 shown in FIGS. 5A and 5B. Inside apex housing 45 is an integral ledge 47 (FIG. 9). A slide-in apex 48 can be dropped into the opening at the upper end of apex housing 45 in the direction of arrow 49 (FIG. 8) until its lower edge rests on ledge 47, as shown in FIG. 9. Slide-in apex 48 can be made of ceramic or other long life, highly abrasion resistant material. When it is time to change the apex of a cyclone having the device shown in FIGS. 8 and 9 therein, the quick release clamp 20 is simply opened to release apex housing 45, which then is removed from the cone. The worn out slide-in apex is removed and discarded, and a new one is inserted in its place. The apex housing 45 with the new ceramic apex insert 48 therein then is quickly attached to the bottom flange such as 66 of a cone such as 1A in the earlier mentioned drawings.

In accordance with another embodiment of the present invention, a laterally slidable apex 50 with an integral skirt is shown in FIGS. 12A and 12B. The particular embodiment of the invention shown in FIGS. 12A and 12B has apex housing 45 and a removable apex insert 48 therein shown in FIGS. 12A and 12B. However, the other apex configurations shown in the drawings could also be utilized. A large "modified trapezoidal" flange 51 is attached to the top edge of apex 50 or, more particularly, to the top edge of apex housing 45. The apex support flange 51 includes a leading edge 52 and two opposed side edges 53 and 54, each of which slope outwardly by approximately three degrees from a line perpendicular to leading edge 52. At the trailing edge of apex support flange 51 there is an elongated opening 55 which serves as a handle for apex support flange 51.

As best seen in FIG. 12A, the lower surface 56 of apex support flange 51 is tapered, so that as apex support flange 51 is inserted into the track 57 shown in FIGS. 13A–13C to a "seated" position, apex support flange 51 is drawn tightly upward against the bottom surface of a flange such as 66 of a cone, such as 1A as shown, for example, in FIG. 10.

On the top of apex support flange 51, an annular sealing bead 59 having a triangular cross section is shown on the upper surface of apex support flange 51 and around the hole 59 into which removable apex insert 48 is inserted. Sealing bead 58 forms a tight seal with the bottom surface of flange 20 of cone 1A.

Referring now to FIGS. 13A–13C, it is seen that track 57 includes two members 57A and 57B which are bolted onto the top surface of a flange such as 66 of a cone such as 1A by means of bolts 60 and 61, respectively.

As best seen from the front view shown in FIG. 13B, track member 57A has an upper flange 61 which is horizontal and a lower flange 62 which is sloped to accommodate the sloped lower surface 56 of apex support flange 50 shown in FIGS. 12A and 12B to thereby accomplish tightening of sealing ring 58 against the bottom surface of cone flange 20 as the apex support flange 51 is inserted into track 57. The configuration of track member 57B is the mirror image of that of track member 57A. In order to lock apex support flange 51 into place once it has been inserted, a lock hole 62 is provided therein, and a pin 64 is inserted in lock hole 62 and extends into a corresponding aligned hole 63 in the upper surface of apex support flange 51 (FIG. 12B).

While the invention has been described with reference to several particular embodiments thereof, those skilled in the art will be able to make various minor modifications to the disclosed embodiments without departing from the true spirit and scope of the invention. As an example, other quick release techniques for attachment of the upper flange of the apex section other than those described herein could be provided. For example, various "peg and slot" arrangements can be readily envisioned for this purpose, although it is believed that the quick release mechanisms described herein are preferable for most applications. Although the preferred embodiments have an integral skirt formed with the apex, it is also possible to provide a quick release removable splash skirt attached with "L" shaped slots at top of the skirt to a corresponding cast in pin provided on the bottom of the apex. Especially for large cyclones which have very high densities, it may be preferable to make the lower cone sections, such as 1B in FIG. 1, easily removable from the upper cone sections by means of a quick release clamp such as 64. A good structure for a quick release removable lower cone section 1B would be to provide an inner liner 67 of cast urethane, neoprene, etc. having upper and lower flanges that is shown in FIG. 1. A steel frusto-conical outer sleeve could be provided as indicated by reference numeral 68 in FIG. 1 and could be bonded to a neoprene, urethane, or rubber liner. The entire unit would be fairly inexpensive and could be thrown away when the liner is sufficiently worn out due to abrasion. If it is desired to use a SNAP-JOINT coupling such as style 78 made by Victaulic Company, suitable receiving grooves can be provided in the upper end of the apex structures shown herein, and a suitable mating adaptor can be permanently bolted to the bottom flange of the cone section to allow use of the SNAP-JOINT coupling (without a gasket) to attach an apex to that adaptor.

I claim:

1. A method of replacing a worn apex attached to a cone of a cyclone, said method comprising the steps of:
 (a) using one hand of an operator for grasping a handle of a quick release locking mechanism that is pivotally attached to a first semicircular section of a split ring clamp, said split ring clamp including a second semicircular section having a first end and a second end, said first semicircular section having a first end and a second end, said second semicircular section being rigidly attached in fixed relation to a flange of a lower portion of said cone, said second end of said first semicircular section being pivotally connected to said second end of said second semicircular section, said quick release mechanism being pivotally connected to said first end of said first semicircular section;
 (b) using said one hand to pull said handle outwardly to effectuate disengagement of said first end of said first semicircular section from said first end of said second semicircular section and simultaneously using another hand of the operator for maintaining the position of said apex so that at least a portion of an upper flange of said apex stays in engagement with said second semicircular section to prevent said apex from falling when said ring clamp is opened;
 (c) further pulling said handle outwardly to cause said first semicircular section to pivot outwardly from said second semicircular section and said upper flange of said apex;
 (d) removing said apex from the vicinity of said cone;
 (e) positioning an upper flange of a new apex into a mating engagement with said second semicircular section of said split ring clamp and in alignment with said cone and maintaining it in that position with only one hand of said operator; and
 (f) using another hand of said operator to pivot said first semicircular section to a closed position and to grasp said handle and force it inwardly to cause said quick release locking mechanism to securely engage said first end of said first semicircular section and lock said first ends of said first and second semicircular sections together and secure said new apex to said flange of said cone.

2. The method of claim 1 including providing an integral splash skirt on said new apex.

3. The method of claim 1 including the step of discarding said worn apex after it is removed from said cone.

4. The method of claim 1 including alerting an operator that it is time to replace said worn apex by causing a minute portion of a liquid flowing through said worn apex to leak through means defining a blow hole that originally extends only part way through a wall of said apex.

5. The method of claim 1 wherein said new apex is composed of semirigid plastic material, said method including the step of tightening a band disposed around the outer surface of said apex to reduce the diameter of the orifice of said new apex in order to compensate for enlargement of the orifice of said new apex due to abrasion by coarse material discharged through said new apex.

6. A quick release apex apparatus for a cyclone, said quick release apex apparatus comprising in combination:

(a) a split ring clamp having a first semicircular ring section and means for rigidly connecting said first semicircular ring section in fixed relation to a flange of a cone of said cyclone, and a second semicircular ring section, said first and second semicircular ring sections each having a first end and a second end, said first end of said second semicircular ring section being pivotally connected to said first end of said first semicircular ring section;

(b) a quick release means having a handle that is easily actuatable by one hand of an operator for drawing said second end of said second semicircular ring section toward said second end of said first semicircular ring section and locking said second end of said first semicircular ring section tightly to said second end of said second semicircular ring section and for releasing said second end of said first semicircular ring section from said second end of said second semicircular ring section; and (c) a plastic apex having means defining an orifice extending therethrough and including an upper integral flange having a sloped lower surface attached to the top of said apex, said split ring clamp engaging said sloped lower surface of said flange of said apex to draw an upper surface of said flange of said apex tightly against a lower surface of said flange of said cone as said quick release means is actuated to its locked position, wherein an operator can use only one hand to either lock or release said apex to said cone while simultaneously using another hand to maintain said apex in alignment with said cone.

7. The quick release apex apparatus of claim 6 wherein said plastic apex includes an integral plastic splash skirt.

8. The quick release apex apparatus of claim 7 wherein said plastic apex includes a thinned wall section surrounding the orifice of said plastic apex and a plurality of integral vertical reinforcing ribs extending outwardly from said thinned wall section.

9. The quick release apex apparatus of claim 8 including means defining a blow through hole extending part way through the wall of said plastic apex from the outer surface thereof for causing leakage of a minute portion of liquid flowing through said orifice in order to alert an operator to replace said plastic apex if the orifice has been enlarged by abrasion of particles passing through said orifice to a point at which said plastic apex should be replaced.

10. The quick release apex apparatus of claim 9 including an adjustable band disposed around the ribbed portion of said plastic apex for adjustably reducing the diameter of said orifice to compensate for enlargement of said orifice due to abrasion thereof caused by particles discharged through said orifice.

11. The quick release apex apparatus of claim 10 wherein said first semicircular ring section includes a center portion including an upper lip and means in the upper lip defining a plurality of holes, said flange of said cone including means defining a plurality of original holes therein, said center portion of said first semicircular ring section being bolted directly to a top surface of said flange of said cone by means of bolts extending through the holes in the upper lip of said first semicircular ring section and passing through the original holes in said flange of said cone.

12. A quick release apex apparatus for a cyclone, said quick release apex apparatus comprising in combination:

(a) a split ring clamp having a first semicircular ring section and means for rigidly connecting said first semicircular ring section in fixed relation to a flange of a cone of said cyclone, and a second semicircular ring section, said first and second semicircular ring sections each having a first end and a second end, said first end of said second semicircular ring section being pivotally connected to said first end of said first semicircular ring section;

(b) quick release means having a handle that is easily actuatable by one hand of an operator for drawing said second end of said second semicircular ring section toward said second end of said first semicircular ring section and locking said second end of said first semicircular ring section tightly to said second end of said second semicircular ring section and for releasing said second end of said first semicircular ring section from said second end of said second semicircular ring section;

(c) a plastic apex housing having means defining an opening extending therethrough and including an upper integral flange attached to the top of said apex and having a sloped lower surface, said split ring clamp engaging said sloped lower surface of said flange of said apex to draw an upper surface of said flange of said apex tightly against a lower surface of said flange of said cone as said quick release means is actuated to its locked position, wherein an operator may either lock or release said apex with respect to said cone by using only one hand while simultaneously using another hand to maintain said apex in alignment with said cone;

(d) an apex insert, having means defining an apex orifice extending therethrough, slidably insertable into and removable from a predetermined position inside said apex housing; and (e) a ledge disposed on the inner wall of said opening of said apex housing for engaging a lower edge of said apex insert to hold said apex insert at said predetermined position.

13. A quick release apex apparatus for a cyclone, said quick release apex apparatus comprising in combination:

(a) an apex including means defining an apex orifice extending therethrough and including a support flange attached to the top of said apex, said support flange having two straight opposed side portions for supporting said apex beneath said cone and extending outward beyond opposite sides of the lower portion of said apex;

(b) track means connected to fixed relationship to a flange of a cone of said cyclone for slidably receiving and supporting said opposed side portions of said support flange as said support flange is slid laterally into said track means to position said apex orifice in an operatively aligned position with respect to said cone, said track means including means for securing said apex in said operatively aligned position;

(c) handle means connected to said support flange for being grasped by a hand of an operator to push said support flange into said track means and pull said support flange out of said track means; and (d) annular sealing means disposed on a top surface of said support flange around said apex orifice for sealing engagement with a bottom surface of said flange of said cone when said support flange is inserted into said track means and is at said operatively aligned position.

14. The quick release apex apparatus of claim 13 wherein said support flange is plastic and is integral with said plastic apex.

15. The quick release apex apparatus of claim 14 wherein said track means include two opposed sloped guide surfaces for slidably receiving and supporting two opposed lower glide surfaces of said two opposed side portions of said support flange, said two glide surfaces on the underside of said support flange being correspondingly sloped to effectuate maintaining the plane of said annular sealing means parallel to the plane of the bottom surface of the flange of said cone.

* * * * *